(12) United States Patent
Lin et al.

(10) Patent No.: US 8,260,074 B2
(45) Date of Patent: Sep. 4, 2012

(54) APPARATUS AND METHOD FOR MEASURING DEPTH AND METHOD FOR COMPUTING IMAGE DEFOCUS AND BLUR STATUS

(75) Inventors: Huei-Yung Lin, Min-Hsiung (TW); Kai-Da Gu, Yonghe (TW); Hung-Chia Wang, Fongshan (TW)

(73) Assignee: National Chung Cheng University, Chiayi County (TW)

( * ) Notice: Subject to any disclaimer, the term of this patent is extended or adjusted under 35 U.S.C. 154(b) by 545 days.

(21) Appl. No.: 12/510,368

(22) Filed: Jul. 28, 2009

(65) Prior Publication Data

US 2010/0310176 A1     Dec. 9, 2010

(30) Foreign Application Priority Data

Jun. 8, 2009  (TW) ............................... 98119118 A

(51) Int. Cl.
*G06K 9/40* (2006.01)
(52) U.S. Cl. .................. 382/255; 382/167; 382/169

(58) Field of Classification Search .................. 382/117, 382/167, 159, 195, 153, 282; 345/32, 690; 353/97; 362/321, 322; 359/291; 250/580, 250/370.09; 700/259; 356/602, 369
See application file for complete search history.

(56) References Cited

U.S. PATENT DOCUMENTS 6,005,669 A * 12/1999 Pahk et al. .................... 356/602
* cited by examiner

*Primary Examiner* — Anh Hong Do
(74) *Attorney, Agent, or Firm* — Ming Chow; Sinorica, LLC

(57) ABSTRACT

An apparatus and a method for measuring the depth of an object in a scene and a method for computing image defocus and blur status are provided. An image analysis unit receives a plurality of reference blurred images, analyzes the reference blurred images, produces reference grey-scale distribution data, where the reference blurred images corresponds to a plurality of reference depths, respectively. A blur comparison module produces a blur model according to the reference grey-scale distribution data and the corresponding reference depths. The image analysis unit receives a target blurred image, analyzes the target blurred image, and produces and transmits target grey-scale distribution data to the blur comparison module for comparing the target grey-scale distribution data according to the blur model, and producing depth information. Moreover, the present invention further produces the corresponding blur status data, used in defocus and blur computations, according to the defocused and blurred image.

34 Claims, 10 Drawing Sheets

APPARATUS AND METHOD FOR MEASURING DEPTH AND METHOD FOR COMPUTING IMAGE DEFOCUS AND BLUR STATUS

FIELD OF THE INVENTION

The present invention relates to an image processing apparatus, and particularly to an apparatus and a method for measuring the depth of an object in a scene, and to a method for computing image defocus and blur status.

BACKGROUND OF THE INVENTION

Distance measurement technology is applied extensively in various fields such as aerial range finding, nautical range finding, industrial range finding, and camera range finding. The image-processing-based depth measurement technologies disclosed in associated academic papers and patents include the following two types of methods:
1. Improvements in system architecture: For example, the U.S. Pat. No. 5,361,127 "Multi-image single sensor depth recovery system" by Daily and Michael J. comprises a sensing device, a multi-faceted lens, and a multi-image stereo depth analysis means. The sensing device has a sensing plane. The multi-faceted lens has a multiplicity of refractive facets for directing radiation directly from an object to said sensor plane. The multi-image stereo depth analysis means analyzes the data stream from said sensing device and determines the depth of said object. Namely, the patent improves the lens structure and hence being able to project multiple images corresponding to the object to the sensing plan.
2. Improvements in algorithm: For example, the U.S. Pat. No. 6,490,364 "Apparatus for enhancing images using flow estimation" by Hanna, et al. provides an apparatus for enhancing images comprising a first imaging device, a second imaging device, and an image processor. The first imaging device produces images at a first resolution. The second imaging device produces images at a second resolution. The image processor aligns said images from said first and second imaging devices to form a plurality of aligned images and computes the parallax of the plurality of aligned images for giving the depth. The first and second imaging devices are cameras, respectively, for acquiring the images of an object. The image processor computes the offset between said two images for giving the parallax corresponding to the object. For ensuring measurement accuracy, multiple images can be acquired from the object, especially when the object is covered.

No matter what kind of technologies described above, two or more images of an object must be acquired first then the corresponding points of the images can be computed for reconstructing the depth information of the object. Nevertheless, current technologies are limited by high hardware costs owing to high circuit complexity or high precision of optical structures, as well as by complex algorithms of image processing. These prevent proper promotion in development and applications.

Accordingly, the present invention provides an apparatus and a method for measuring the depth of an object in a scene, which can provide better computing efficiency with simpler circuit. Hence, the problems described above can be solved.

SUMMARY

An objective of the present invention is to provide an apparatus and a method for measuring the depth of an object in a scene and a method for computing image defocus and blur status, which use a blur model to compare a target blurred image for giving depth information. Thereby, the computation for depth is simplified.

Another objective of the present invention is to provide an apparatus and a method for measuring the depth of an object in a scene and a method for computing image defocus and blur status, which use the existing grey scales in the image data to perform analysis for giving the corresponding grey-scale distribution data in depth measurement. Thereby, image processing is reduced.

Still another objective of the present invention is to provide an apparatus and a method for measuring the depth of an object in a scene and a method for computing image defocus and blur status, which use the blurred images caused by defocus to perform computation for giving the blur status data. Thereby, the blur model or the depth information can be produced.

The present invention provides an apparatus and a method for measuring the depth of an object in a scene and a method for computing image defocus and blur status. The apparatus for measuring the depth of an object in a scene comprises an image analysis unit and a blur comparison module. The image analysis unit receives a plurality of reference blurred images, analyzes the grey scales thereof, produces reference grey-scale distribution data, and transmits the data to the blur comparison module. The reference grey-scale distribution data corresponds to a plurality of reference depths. The blur comparison module produces a blur model according to the reference grey-scale distribution data and the plurality of reference depths. The image analysis unit receives a target blurred image, analyzes its grey scales, produces corresponding target grey-scale distribution data, and transmits the data to the blur comparison module. The blur comparison module performs comparing according to the target grey-scale distribution data and the blur model, and produces depth information corresponding to the target blurred image. According to the present invention, because the plurality of reference blurred images and the corresponding plurality of reference depths are used for building the blur model first, when the apparatus for measuring the depth of an object in a scene according to the present invention measures the depth of the target blurred image, the blur model can be used to compare with the target blurred image for giving the corresponding depth information. Thereby, computational complexity in depth is reduced and the computational efficiency is improved. In addition, the present invention further produces blur status data according to defocused and blurred images. Hence, the computational efficiency for defocus and blur is enhanced as well.

DETAILED DESCRIPTION

In order to make the structure and characteristics as well as the effectiveness of the present invention to be further understood and recognized, the detailed description of the present invention is provided as follows along with preferred embodiments and accompanying figures.

Firstly, the defocus and blur theory adopted by the present invention is described as follows.

Figure 1:
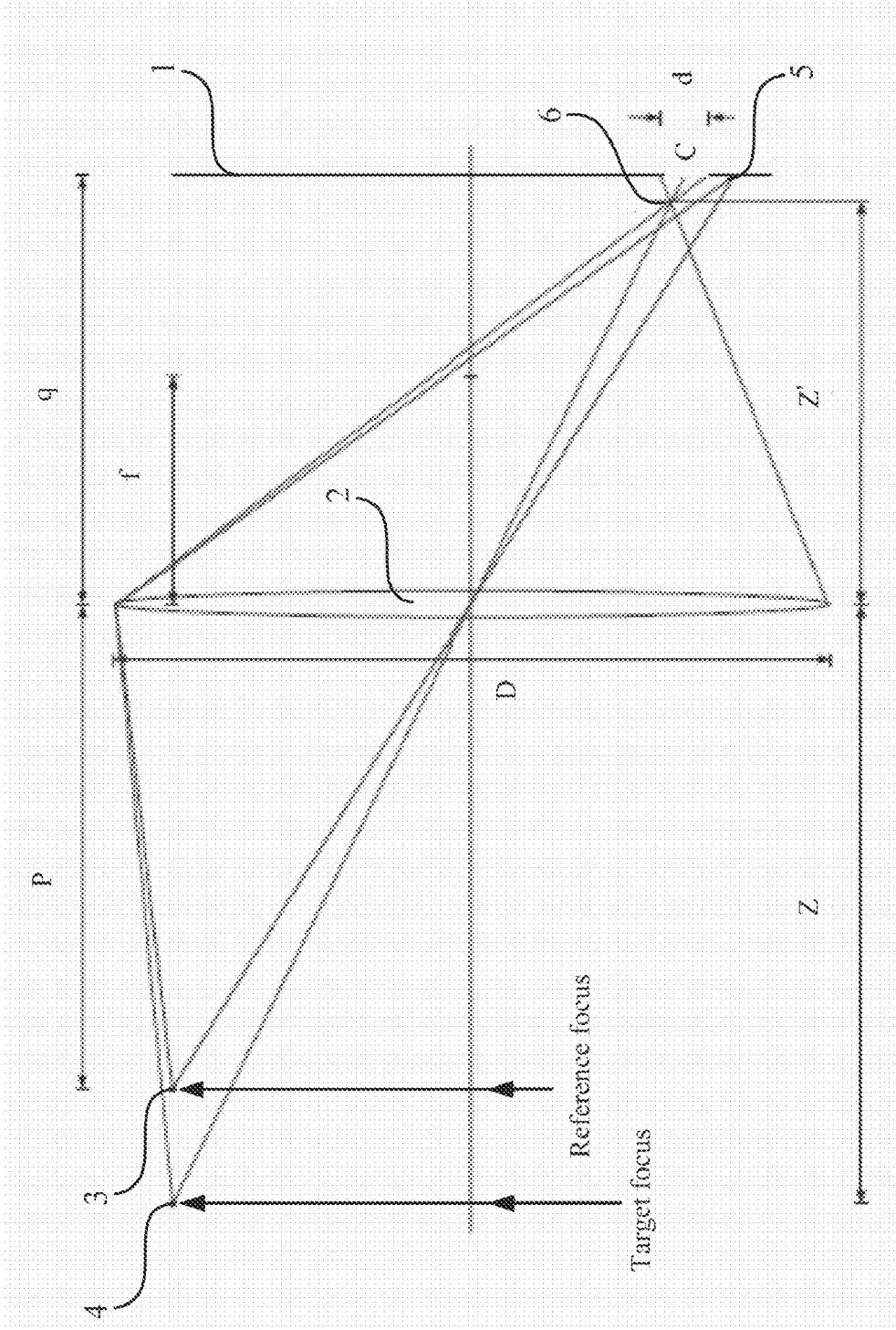
FIG. 1 shows a schematic diagram of the optical model used in the present invention.

FIG. 1 shows a schematic diagram of the optical model used in the present invention. As shown in the figure, the optical model used in the present invention comprises a lens 1, an image-sensing plane 2, a reference focus 3, a target focus 4, a reference imaging point 5, and a target imaging point 6. The diameter of the lens 1 is D; the optical focal length of the lens 1 is f. There is a reference image distance q between the lens 1 and the image-sensing plane 2. Namely, the distance between the lens 1 and the target imaging point 6 is the reference image distance q. Besides, there is a reference object distance p between the lens 1 and the reference focus 3; there is a target object distance z between the lens 1 and the target focus 4. Because the target focus 4 is not the reference focus 3, the corresponding target imaging point 6 of the target focus 4 is not on the image-sensing plane 2. That is to say, the light radiated from an object located at the target focus 4 will pass the lens 1 and form a defocused blurred image on the image-sensing plane 2. According to the present preferred embodiment, a blurred circle C is used for example. However, the blurred image is not limited to a circle.

By the optical model described above, it is known that:

$$\frac{1}{f} = \frac{1}{p} + \frac{1}{q} \quad (1)$$

where f is the optical focal length of the lens 1; p is the reference object distance between the lens 1 and the reference focus 3; and q is the reference image distance between the lens 1 and the image-sensing plane 2.

$$\frac{1}{f} = \frac{1}{z} + \frac{1}{z'} \quad (2)$$

where f is the optical focal length of the lens 1; z is the reference object distance between the lens 1 and the target focus 4; and z' is the reference image distance between the lens 1 and the target imaging point 6.

According to the geometrical relations in FIG. 1, it is deduced that:

$$\frac{d}{D} = \frac{q - z'}{z'} \quad (3)$$

where d is the diameter of the blurred circle; D is the diameter of the lens 1; q is the reference image distance between the lens 1 and the image-sensing plane 2; z' is the target image distance between the lens 1 and the target imaging point 6. After substituting the reference image distance p into Equation (1), rearrange terms and gives:

$$d = Dq\left(\frac{1}{f} - \frac{1}{q} - \frac{1}{z}\right) \quad (4)$$

Because q is unknown, substitute Equation (2) into Equation (4) and rearrange terms to give:

$$d = \frac{Dpf}{p - f}\left(\frac{1}{p} - \frac{1}{z}\right) \quad (5)$$

Simplifying Equation (5) gives:

$$d = c - \frac{cp}{z} \quad (6)$$

where c is a constant:

$$c = \frac{pf}{p - f} \quad (7)$$

Rearranging Equation (6) gives the target object distance z:

$$z = \frac{cp}{c - d} \quad (8)$$

where the target object distance z is the depth to be measured according to the present invention.

Figure 2:
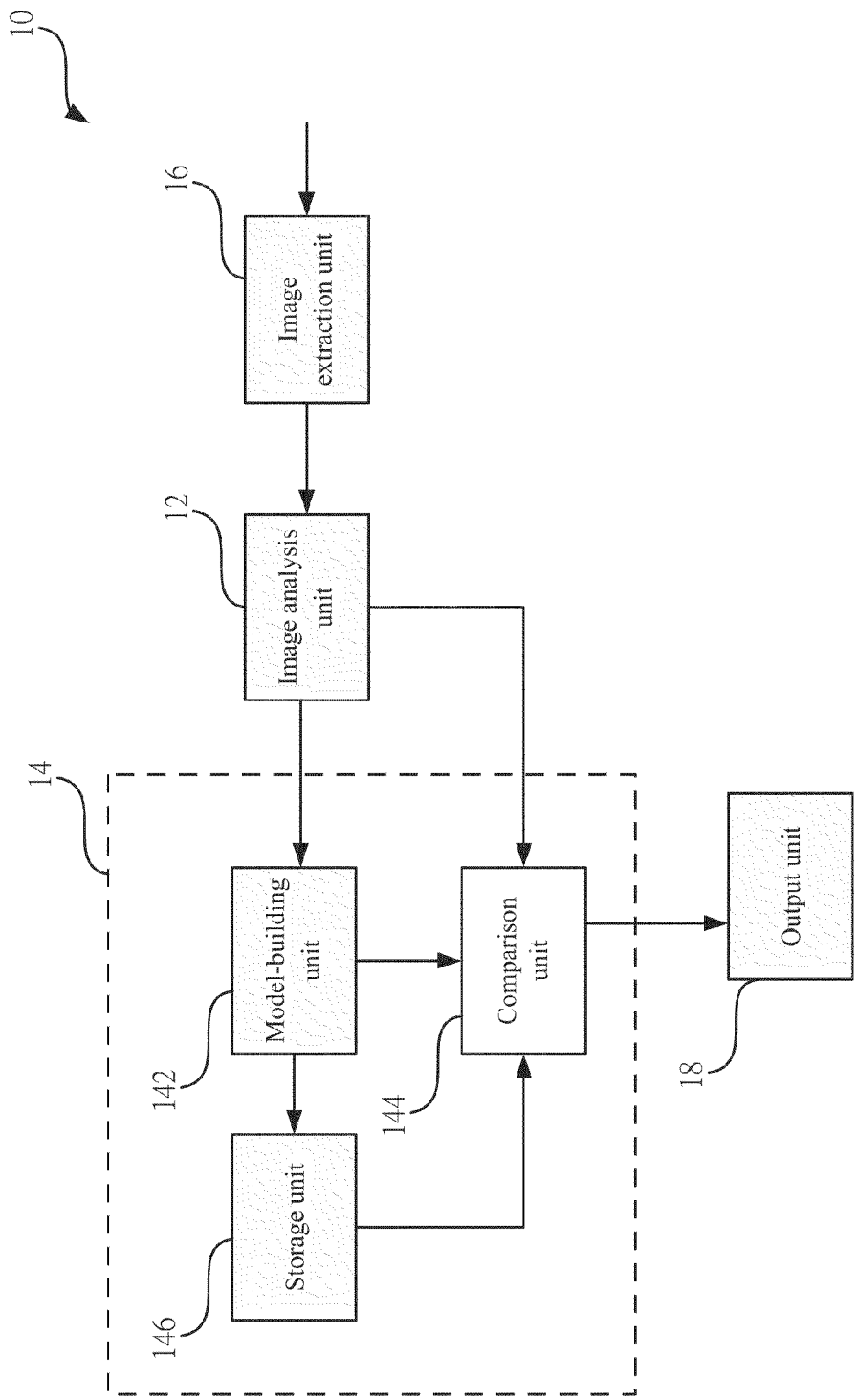
FIG. 2 shows a block diagram according to a preferred embodiment of the present invention.
Figure 3A:
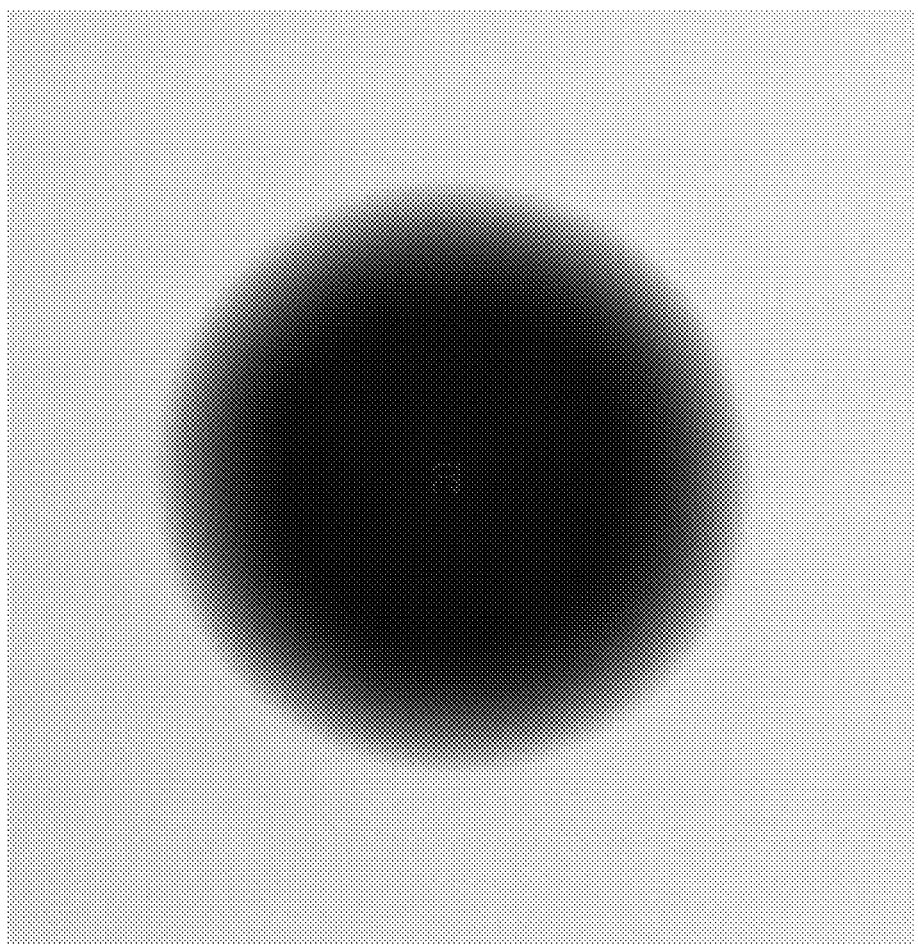
FIG. 3A shows a schematic diagram of the blurred circle according to a preferred embodiment of the present invention.
Figure 3B:
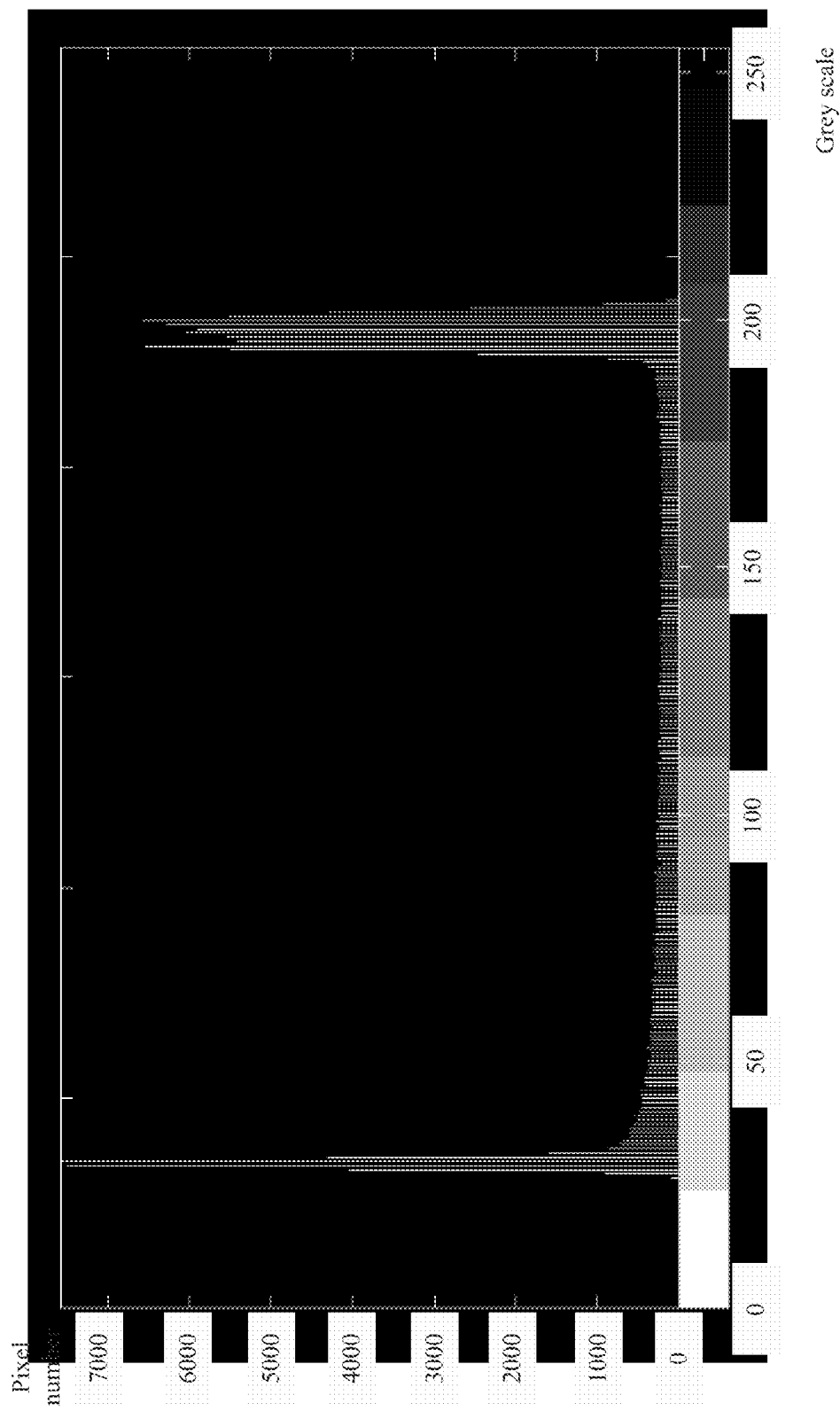
FIG. 3B shows a schematic diagram of the grey scales according to a preferred embodiment of the present invention.
Figure 3C:
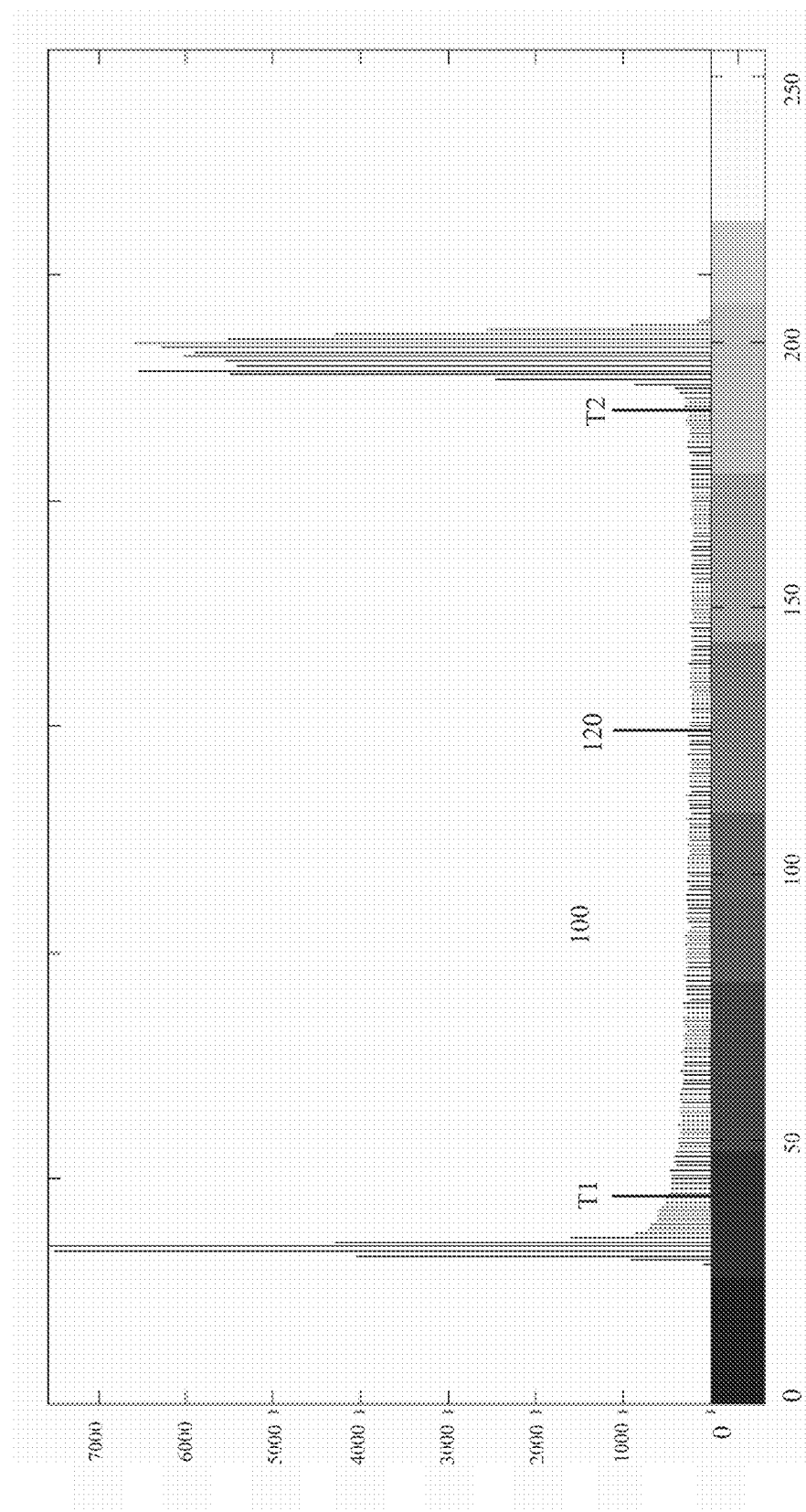
FIG. 3C shows a schematic diagram of the boundaries according to a preferred embodiment of the present invention.
Figure 3D:
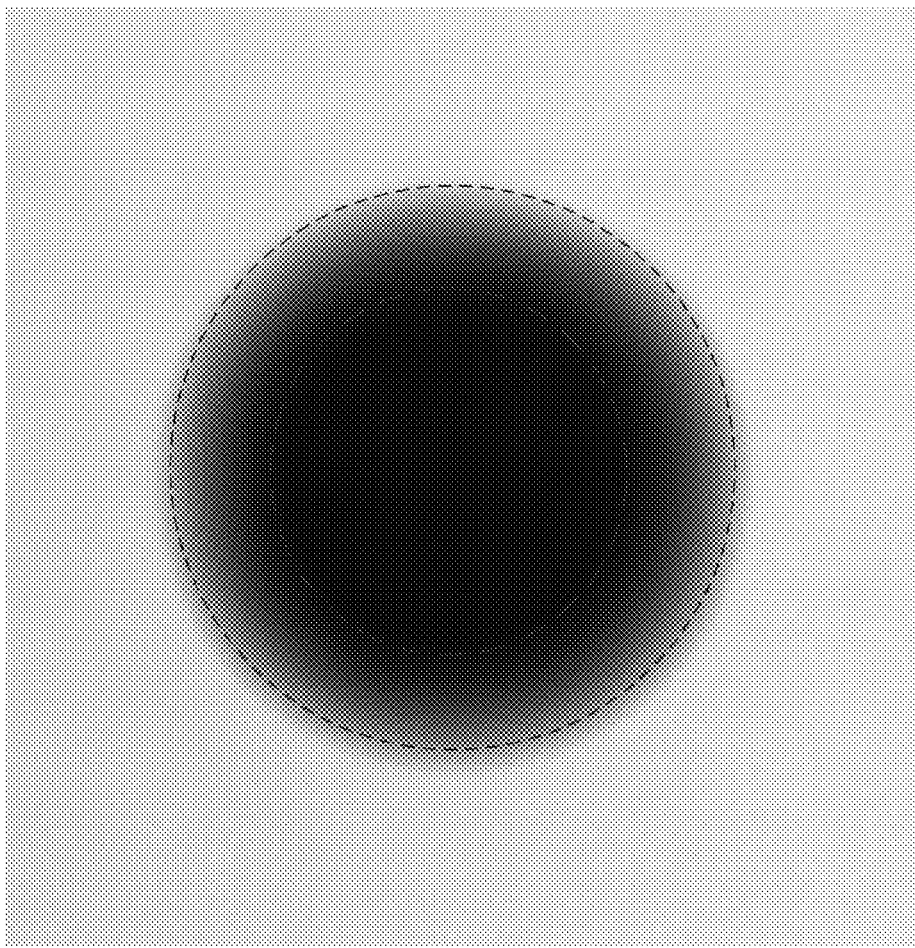
FIG. 3D shows a schematic diagram of the inner and outer peripheries of the blurred circle according to a preferred embodiment of the present invention.

FIG. 2 shows a block diagram according to a preferred embodiment of the present invention. As shown in the figure, the apparatus for measuring depth 10 according to the present invention comprises an image analysis unit 12 and a blur comparison module 14. The blur comparison module 14 comprises a model-building unit 142 and a comparison unit 144. The image analysis unit 12 connects to the model-building unit 142 and the comparison unit 144, respectively. The image analysis unit 12 receives a plurality of defocused reference blurred images, analyzes their grey scales, and thereby produces reference grey-scale distribution data and transmits the data to the model-building unit 142 of the blur comparison module 14, where the plurality of reference blurred images corresponds to a plurality of reference depths, respectively. As shown in FIG. 3A, the image of a blurred circle represents the reference blurred image according to the present preferred embodiment. The degree of blur is different for reference blurred images with different reference depths. The blurred circle in FIG. 3A corresponds to a reference depth. Hence, after the image analysis unit 12 analyzes the plurality of reference blurred images corresponding to different reference depths, it will produce different corresponding reference grey-scale distribution data as shown in FIG. 3B. In addition, the image analysis unit 12 further analyzes the reference grey-scale distribution data. That is, the image analysis unit 12 computes according to the reference grey-scale distribution data, a reference value of pixel number, a first threshold value of pixel number, and a second threshold value of pixel number. As shown in FIG. 3C, the image analysis unit 12 gives a first boundary value T1 and a second boundary value T2 according to the reference value of pixel number and the threshold values of pixel number. The boundary values T1 and T2 correspond to the inner circle 22 and the outer circle 24 of the blurred circle in FIG. 3A. Their locations are shown in FIG. 3D.

Figure 4:
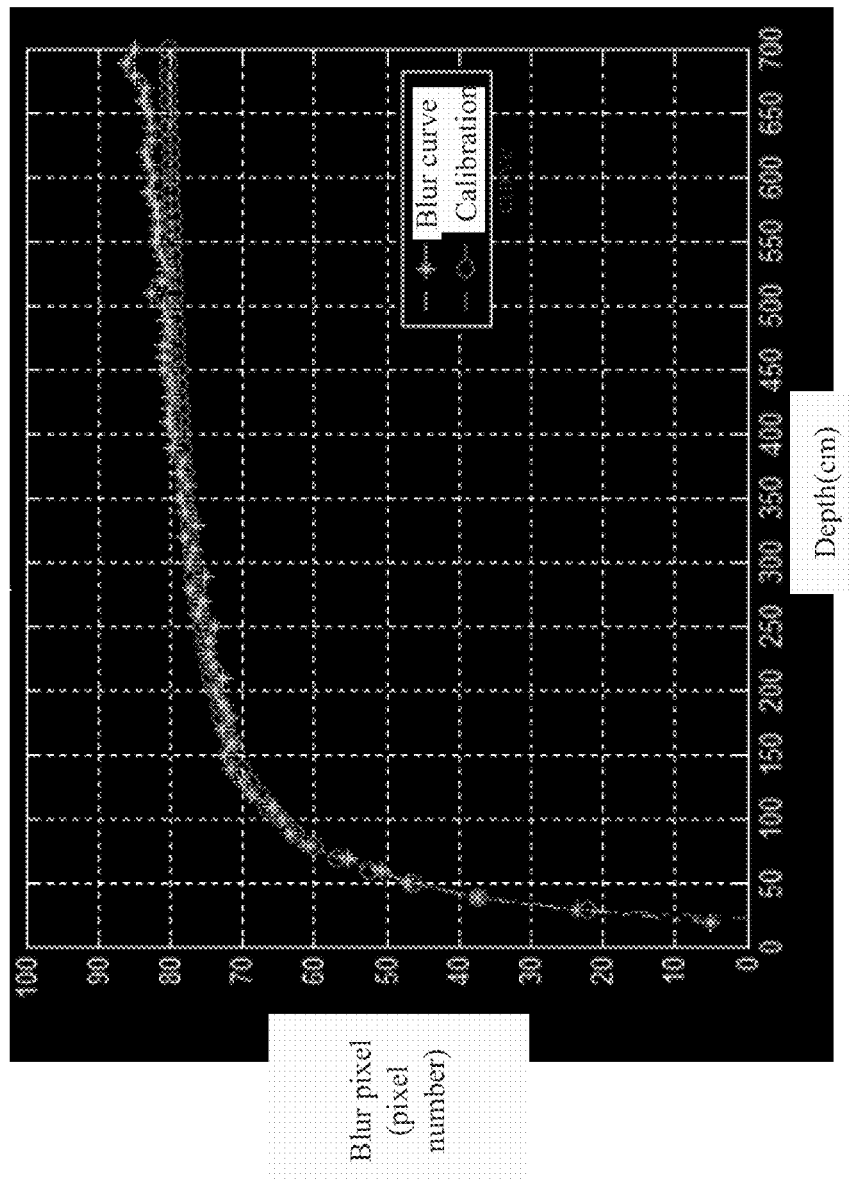
FIG. 4 shows curves of the model according to a preferred embodiment of the present invention.

The image analysis unit 12 gives reference blur status data according to the boundary values T1 and T2 in the reference grey-scale distribution data. Namely, the boundary values T1 and T2 are summed up to give a plurality of first summed areas and a plurality of second summed areas for giving the reference blur status data according to the boundary values T1 and T2, respectively. The image analysis unit 12 produces corresponding blur areas according to the plurality of first summed areas and the plurality of second summed areas. Then a blur diameter formula is used to give a plurality of reference blur radii. The blur diameter formula is given as:

$$b = \Delta R = R_2 - R_1 = \frac{1}{\sqrt{\pi}}(\sqrt{A_2} - \sqrt{A_1}) \quad (9)$$

where b is the blur diameter; $R_2$ is the diameter of the outer circle; $R_1$ is the diameter of the inner circle; $A_2$ is the area of the outer circle; and $A_1$ is the area of the inner circle. By Equation (9), there is a relation between the blur area and the blur diameter. Thereby, the image analysis unit 12 produces the blur diameter b according to Equation (9). Then the model-building unit 142 produces a blur model according to the reference blur status data and the plurality of reference depths corresponding to the plurality of reference blurred images. Because the blur diameter is produced by the image analysis unit 12 according to the blur area and there is a relation between the blur area and the blur diameter, the model-building unit 142 can further produce the blur model according to the blur area. Hence, the blur status data is the blur diameter or the blur area. Because the plurality of reference blurred images corresponds to one or more focal lengths, the model-building unit 142 builds a curve corresponding to the blur model according to each focal length. In order to make the blur model complete, the model-building unit 142 according to the present invention builds a curve corresponding to a calibration model according to various focusing requirements. FIG. 4 shows curves built by the model-building unit 142 at a focal length of 20 cm. The model-building unit 142 measures the blur diameter or the corresponding blur area and the reference depth to build the blur curve, which is the curve corresponding to the blur model. By means of Equation (8), the model-building unit 142 gives the calibrated blur diameter or blur area according to the corresponding extracted parameters of the plurality of reference blurred images and the reference depth. Then the calibrated blur diameter or blur area and the corresponding reference depth are used for building the calibrated curve, which is the curve corresponding to the calibration model. According to the present preferred embodiment, the blur model is built according to the data measured on different target object distances at one of the focal lengths, the blur diameter, and the reference depth. Besides, the blur model can be further given by using the blur area and the corresponding reference depth. The blur comparison module 14 further includes a storage unit 146, used for storing the blur model and the calibration model. The apparatus for measuring depth 10 according to the present invention further comprises an image extraction unit 16, which extracts the plurality of reference blurred images and the target blurred image. For extraction of each image, the image extraction unit 16 will produce an extraction parameter corresponding to the image. The apparatus for measuring depth 10 according to the present invention uses the image extraction unit 16 to extract the reference blurred image directly for performing measurement. However, the present invention is not limited to this procedure. The image analysis unit 12 according to the present invention can further receive the existing blurred images directly for performing analysis and building models.

Figure 5:
FIG. 5 shows a schematic diagram of a target blurred image according to a preferred embodiment of the present invention.

After the blur model is built, the image extraction unit 16 extracts a target blurred image of a target object under a defocused status, where the target blurred image corresponds to a target focal length. The target blurred image is shown as FIG. 5. The image extraction unit 16 transmits the target blurred image to the image analysis unit 12, which analyzes the grey scales of the target blurred image and produces target grey-scale distribution data correspondingly. The image analysis unit 12 according to the present preferred embodiment performs analysis according to the boundaries of the target blurred image. In addition, the image analysis unit 12 performs computations according to the target grey-scale distribution data, a reference value of pixel number, a first threshold value of pixel number, and a second threshold value of pixel number for giving the first boundary value and the second boundary value corresponding to the target blurred image. The image analysis unit 12 gives the target blur status data according to the first and second boundary values and transmits the data to the comparison unit 144. The comparison unit 144 performs comparison between the target blur status data and the blur model produced by the model-building unit 142 and gives the depth information, where the target blur status data can be a target blur area or a target blur diameter. Besides, the comparison unit 144 according to the present invention further performs calibration according to the blur curve of the blur model and the calibration curves of the calibration model. For example, the calibration curve corresponding to a depth of 200 mm is directed to a blur diameter of 30. However, the measured value of the calibration curve corresponding to the blur curves is 32.5. Thereby, when the comparison unit 144 compares the measured value 32.5 of the blur diameter, it will direct to the depth information of 200 mm. That is to say, the corresponding depth of the measured value 32.5 of the blur area is 200 mm. Moreover, the present invention further comprises an output unit 18, which receives the depth information produced by the comparison unit 144 and outputs the depth information.

It is known from above description that, according to the present invention, the complex algorithm is transformed into the blur model built on the correspondence between the depth and the blur diameter. Thereby, the apparatus for measuring depth 10 can perform depth measurement only according to a target blurred image of the target object without the need of altering the hardware structure of the image extraction unit 16 or the algorithm. The present system first uses the fixed and known camera parameters and changes the distance between the object and the camera for extracting multiple images using a solid circle as the pattern. Then it uses the statistical charts of various images to find the inner circle and the outer circle defining the possible defocus and blur. Thereby, the defocus and blur status of each image is calculated and used as a basis for calibration. If an image with an unknown depth is extracted using the same camera parameters, the present system can compute the defocus and blur status of the image, and then gives a value from a built model. Said value is the depth information of the object in the image.

Figure 6A:
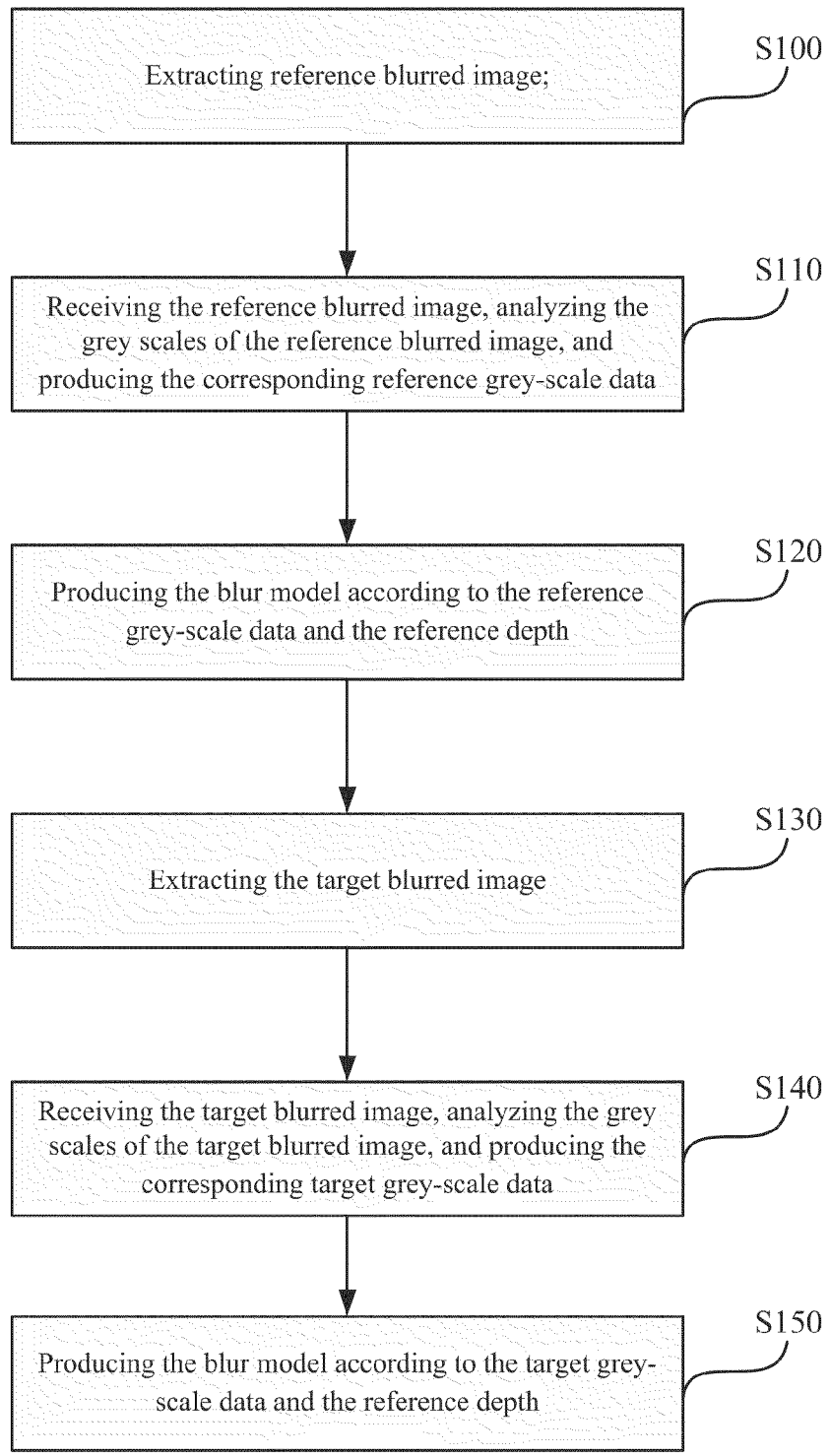
FIG. 6A shows a flowchart of depth measurement according to a preferred embodiment of the present invention.
Figure 6B:
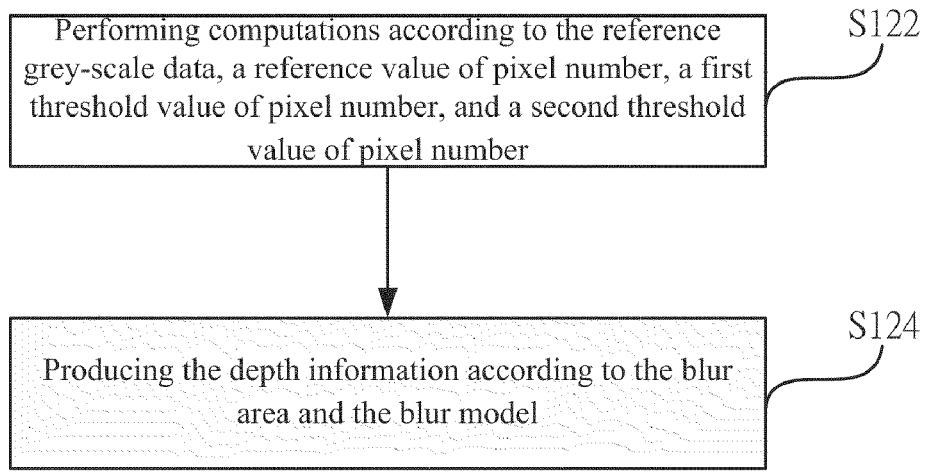
FIG. 6B shows a flowchart of building the model according to a preferred embodiment of the present invention.
Figure 6C:
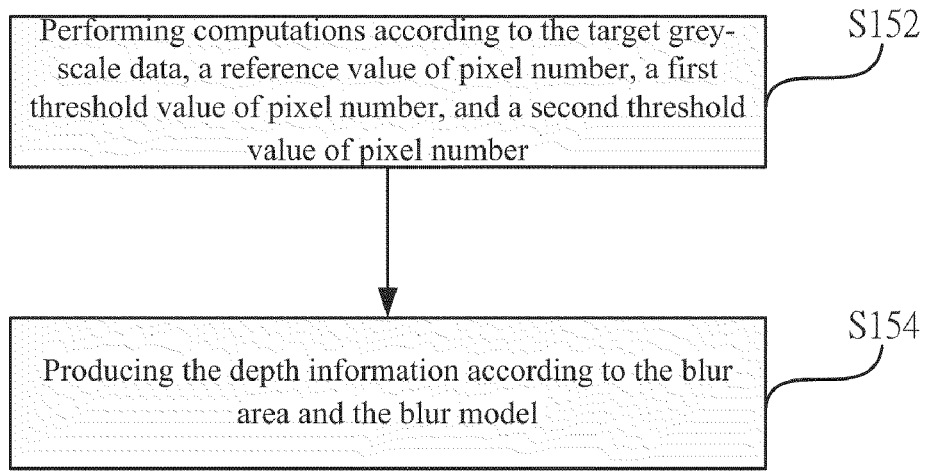
FIG. 6C shows a flowchart of giving the depth according to a preferred embodiment of the present invention.

FIG. 6A shows a flowchart of depth measurement according to a preferred embodiment of the present invention. As shown in the figure, the method for measuring depth according to the present invention comprises steps of:

Step S100: Extracting reference blurred image;

Step S510: Receiving the reference blurred image, analyzing the grey scales of the reference blurred image, and producing the corresponding reference grey-scale distribution data;

Step S120: Producing the blur model according to the reference grey-scale distribution data and the reference depth;

Step S130: Extracting the target blurred image;

Step S140: Receiving the target blurred image, analyzing the grey scales of the target blurred image, and producing the corresponding target grey-scale distribution data; and Step S150: Producing the blur model according to the target grey-scale distribution data and the reference depth.

In the step S100, an image extraction unit 16 is used for extracting a plurality of reference blurred images corresponding to a plurality of reference depths, respectively. In the step S110, the image analysis unit 12 receives the plurality of reference blurred images extracted by the image extraction unit 16, analyzes the grey scales, and produces corresponding reference grey-scale distribution data.

The step S120 further comprises steps of:

Step S122: Performing computations according to the reference grey-scale distribution data and producing corresponding reference blur status data; and Step S124: Producing the blur model according to the reference blur status data and the plurality of reference depths.

In the step S122, the image analysis unit 12 computes according to the reference grey-scale distribution data, a reference value of pixel number, a first threshold value of pixel number, and a second threshold value of pixel number, and produces the corresponding reference blur status data, where the reference blur status data is a plurality reference blur areas or a plurality of reference blur diameters. In the step S124, the blur comparison module 14 produces the blur model according to the reference blur status data and the plurality of depths, where the reference blur status data is a plurality of reference blur areas or a plurality of reference blur diameters. In addition, the present preferred embodiment further comprises the step of producing a calibration model according to the extracted information corresponding to the reference blurred image.

Moreover, the step S150 further comprises steps of:

Step S152: Performing computations according to the target grey-scale distribution data and producing corresponding target blur status data; and Step S154: Producing the depth information according to the target blur status data and the blur model.

In the step S152, the image analysis unit 12 computes according to the target grey-scale distribution data, a reference value of pixel number, a first threshold value of pixel number, and a second threshold value of pixel number, and produces the corresponding target blur diameter or the target blur area.

To sum up, the apparatus and method for measuring the depth of an object in a scene and the method for computing image defocus and blur status according to the present invention measure the corresponding depth of a target blurred image of a target object mainly by the blur model built by the reference blurred image and the reference depth. Because the apparatus for measuring depth according to the present invention compares the blur model directly for giving the depth corresponding to the target blurred image, no complex computations are needed and hence the measurement efficiency is superior. Because no complex computations are needed, the circuit complexity is relatively reduced. In addition, the method for computing image defocus and blur status according to the present invention produces image defocus and blur model and measures depth, and thus the computation efficiency is improved.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. An apparatus for measuring depth, comprising:
   an image analysis unit, receiving a plurality of reference blurred images, analyzing a plurality of grey scales of the plurality of reference blurred images, producing corresponding reference grey-scale distribution data, in which the plurality of reference blurred images corresponding to a plurality of reference depths, respectively; and
   a blur comparison module, producing a blur model according to the reference grey-scale distribution data and the plurality of reference depths;
   where the image analysis unit receives a target blurred image, analyzes the grey scales of the target blurred image, and produces and transmits target grey-scale distribution data to the blur comparison module; the blur comparison module compares the target grey-scale distribution data according the blur model, and produces depth information corresponding to the target blurred image.

2. The apparatus for measuring depth of claim 1, wherein the blur comparison module comprises:
   a model-building unit, producing the blur model according to the reference grey-scale distribution data and the corresponding plurality of reference depths; and
   a comparison unit, producing the depth information corresponding to the target blurred image according to the blur model and the target blurred image.

3. The apparatus for measuring depth of claim 2, wherein the model-building unit further produces a corresponding calibration model according to a plurality of extraction parameters corresponding to the plurality of reference blurred images and the plurality of reference depths; and the comparison unit further calibrates the depth information according to the calibration model.

4. The apparatus for measuring depth of claim 2, wherein the blur comparison module further comprises a storage unit, storing the blur model.

5. The apparatus for measuring depth of claim 1, wherein the image analysis unit computes according to the reference grey-scale distribution data, and produces reference blur status data; and the blur comparison module produces the blur model according to reference blur status data and the plurality of reference depths.

6. The apparatus for measuring depth of claim 5, wherein the image analysis unit computes according to the reference grey-scale distribution data, a reference value of pixel number, a first threshold value of pixel number, and a second threshold value of pixel number, and produces the corresponding reference blur status data.

7. The apparatus for measuring depth of claim 6, wherein the image analysis unit computes and gives a plurality of first boundary values and a plurality of second boundary values corresponding to the reference grey-scale distribution data according to the reference grey-scale distribution data, the reference value of pixel number, the first threshold value of pixel number, and the second threshold value of pixel number, and performs summation according to the plurality of first boundary values and the plurality of second boundary values, respectively, to produce the corresponding reference blur status data.

8. The apparatus for measuring depth of claim 6, wherein the reference blur status data is a plurality of reference blur areas or a plurality of reference blur diameters.

9. The apparatus for measuring depth of claim 1, wherein the image analysis unit computes according to the target grey-scale distribution data and produces a corresponding target blur diameter; and the blur comparison module compares according to the target blur diameter or the target blur status data.

10. The apparatus for measuring depth of claim 9, wherein the image analysis unit computes according to the target grey-scale distribution data, a reference value of pixel number, a first threshold value of pixel number, and a second threshold value of pixel number, and produces the corresponding target blur status data.

11. The apparatus for measuring depth of claim 10, wherein the image analysis unit computes and gives a first boundary value and a second boundary value corresponding to the target grey-scale distribution data according to the reference value of pixel number, the first threshold value of pixel number, and the second threshold value of pixel number, and performs summation according to the first boundary value and the second boundary value, respectively, to produce the corresponding target blur status data.

12. The apparatus for measuring depth of claim 9, wherein the target blur status data is a target blur area or a target blur diameter.

13. The apparatus for measuring depth of claim 1, and further comprising:
an image extraction unit, extracting the plurality of reference blurred images and the target blurred image; and
an output unit, outputting the depth information.

14. The apparatus for measuring depth of claim 13, wherein the image extraction unit extracts parameters according to the plurality of reference blurred images.

15. The apparatus for measuring depth of claim 1, wherein the plurality of reference blurred images corresponds to one or more reference focal lengths.

16. The apparatus for measuring depth of claim 1, wherein the target blurred image corresponds to a target focal length.

17. A method for measuring depth, comprising steps of:
using an image analysis unit for receiving a plurality of reference blurred images, in which the plurality of reference blurred images corresponding to a plurality of reference depths;
using the image analysis unit for analyzing a plurality of grey scales of the plurality of reference blurred images, and producing corresponding reference grey-scale distribution data to a blur comparison module;
using the blur comparison module for producing a blur model according to the reference grey-scale distribution data and the plurality of reference depths;
using the image analysis unit for receiving a target blurred image;
using the image analysis unit for analyzing the grey scales of the target blurred images, and producing corresponding target grey-scale distribution data to the blur comparison module;
using the blur comparison module for producing depth information of the target blurred image according to the target grey-scale distribution data and the blur model.

18. The method for measuring depth of claim 17, wherein the step of the blur comparison module producing a blur model according to the reference grey-scale distribution data and the plurality of reference depths further comprises:
the blur comparison module computing according to the reference grey-scale distribution data and producing corresponding reference blur status data; and
the blur comparison module producing the blur model according the reference blur status data and the plurality of reference depths.

19. The method for measuring depth of claim 18, wherein the step of the blur comparison module computing according to the reference grey-scale distribution data and producing corresponding reference blur status data computes according to the reference grey-scale distribution data, a reference value of pixel number, a first threshold value of pixel number, and a second threshold value of pixel number, gives a plurality of first boundary values and a plurality of second boundary values corresponding to the reference grey-scale distribution data, and produces the corresponding reference blur status data.

20. The method for measuring depth of claim 18, wherein the reference blur status data is a plurality of reference blur areas or a plurality of reference blur diameters.

21. The method for measuring depth of claim 17, wherein the step of the blur comparison module producing depth information of the target blurred image according to the target grey-scale distribution data and the blur model further comprises:
the blur comparison module computing according to the target grey-scale distribution data and producing corresponding target blur status data; and
the blur comparison module producing the depth information according to the target blur status data and the blur model.

22. The method for measuring depth of claim 21, wherein the step of the blur comparison module computing according to the target grey-scale distribution data and producing corresponding target blur status data computes according to the target grey-scale distribution data, a reference value of pixel number, a first threshold value of pixel number, and a second threshold value of pixel number, gives a first boundary value and a second boundary value corresponding to the target grey-scale distribution data, and produces the corresponding target blur status data.

23. The method for measuring depth of claim 21, wherein the target blur status data is a target blur area or a target blur diameter.

24. The method for measuring depth of claim 21, further comprising a step of calibrating the depth information after the step of the blur comparison module producing the depth information according to the target blur status data and the blur model.

25. The method for measuring depth of claim 17, further comprising a step of extracting the plurality of reference blurred images before the step of an image analysis unit receiving a plurality of reference blurred images.

26. The method for measuring depth of claim 17, further comprising a step of extracting a target blurred image before the step of receiving a target blurred images.

27. The method for measuring depth of claim 17, wherein the plurality of reference blurred images corresponds to one or more reference focal lengths.

28. The method for measuring depth of claim 17, wherein the target blurred image corresponds to a target focal length.

29. The method for measuring depth of claim 17, further comprising a step of outputting the depth information.

30. A method for computing image defocus and blur status, applied to computation of blurred image in an image analysis unit, and comprising steps of:
 using an image analysis unit for receiving a blurred image, and analyzing a plurality of grey scales of the blurred image for producing grey-scale distribution data;
 using a blur comparison module for computing according to the grey-scale distribution data, and producing a first boundary value and a second boundary value corresponding to the grey-scale distribution data; and
 using the blur comparison module for producing corresponding blur status data according to the first boundary value and the second boundary value.

31. The method for computing image defocus and blur status of claim 30, wherein the step of an image analysis unit receiving a blurred image, and analyzing the grey scales of the blurred image for producing grey-scale distribution data analyzes the pixel number of the blurred image in each grey-scale level.

32. The method for computing image defocus and blur status of claim 30, wherein the step of an blur comparison module computing according to the grey-scale distribution data comprises computing and giving the first boundary value and the second boundary value according to the grey-scale distribution data, a reference value of pixel number, a first threshold value of pixel number, and a second threshold value of pixel number.

33. The method for computing image defocus and blur status of claim 30, wherein the step of the blur comparison module producing corresponding blur status data according to the first boundary value and the second boundary value performs pixel summation according to the first boundary value and the second boundary value, respectively, producing a corresponding first summed area and a second summed area, subtracting the first summed area from the second summed area, and producing the blur status data.

34. The method for computing image defocus and blur status of claim 30, wherein the blur status data is a blur area or a blur diameter.

\* \* \* \* \*